J. O. Ward,
Peach Parer,
№ 8,460,   Patented Oct. 21, 1851.
Fig 1,
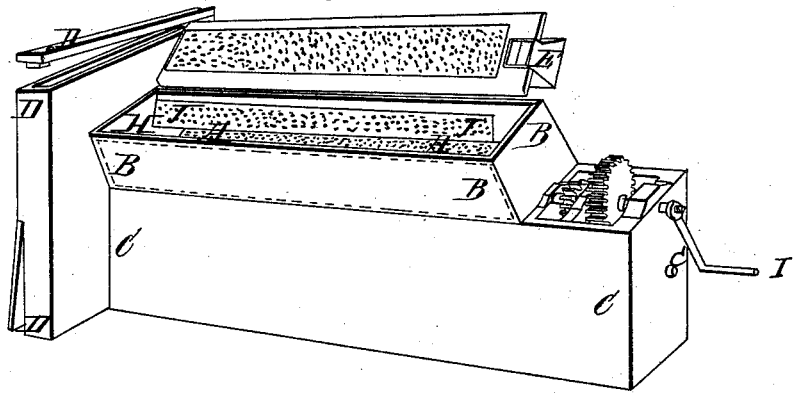
Fig 2,
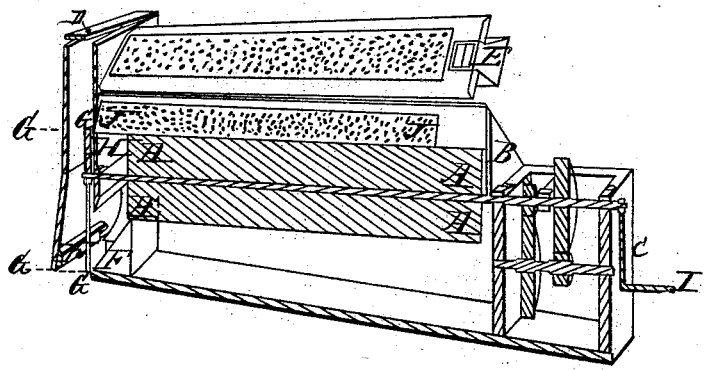

UNITED STATES PATENT OFFICE.

JOSHUA O. WARD, OF PLEASANT VALLEY, NEW YORK.

MACHINE FOR PEELING AND CUTTING PEACHES.

Specification of Letters Patent No. 8,460, dated October 21, 1851.

*To all whom it may concern:*

Be it known that I, JOSHUA O. WARD, of the town of Pleasant Valley, in the county of Dutchess and State of New York, have invented a new and useful Machine for Peeling and Cutting Peaches; and I do hereby declare that the following is a full, clear, and exact description of the construction and operation of the same, reference being had to the annexed drawings, making a part of this specification, in which—

Figure 1, (one) is a perspective view; and Fig. 2 (two) a longitudinal sectional view of said machine.

To describe my machine generally, it consists of a cylinder, (A A), covered with sheet tin punched with holes like a nutmeg grater, made to revolve rapidly in a frame or box, (C C), upon which the axis of the cylinder rests. The upper half of the cylinder is covered by a box or hopper, (B B), extending its whole length and somewhat beyond the further end of the cylinder, so as to leave a space, (H), between the end of the cylinder and the end of the hopper, large enough to permit the peaches to drop through. This hopper is also lined with tin punched with holes and the top opens on hinges. It is represented open in the annexed drawings, but must be closed when working the machine. The peaches are dropped into the hopper through an opening (E) at the near end, and are peeled by the rasping effect of the cylinder when in rapid motion as they pass over its surface toward the further end, where they fall through the opening (H), and pass over the inclined plane (F, Fig. 2,) into the knife-box (D D, Fig. 1), which is of such a width that when the peach strikes the outer side thereof the center of the peach is directly under the knife, (G G, Fig. 2,) which revolves on the axis of the cylinder. The peach is immediately struck by the gnife and cut into several pieces, and the stone and pulp thus cut are by the rapid revolutions of the knife knocked through an opening for that purpose in the bottom of the box (D D) directly under the knife, into a basket or other vessel placed there for the reception of the fruit. The peel or skin of the peaches collects in the box beneath the cylinder, and in order to remove the same, the box (C C) is not permanently fastened to the bottom but may be lifted off as occasion requires.

To enable others skilled in the art to make and use my machine I add the following particulars of its construction and operation.

The cylinder, A A, which is of wood should be about three and a half feet in length and about seven inches in diameter. A slight variation of these dimensions is immaterial, it being however borne in mind that the longer the diameter the less rapid the revolutions should be, and the longer the cylinder the greater quantity of peaches may be peeled in a given time, as they may be made to pass more rapidly over its surface by elevating the nearer end. If much exceeding the length above specified the peaches will be apt to be too much rasped. A cylinder of the size above mentioned should be so geared as to make between seven hundred and eight hundred revolutions in a minute. The revolutions are over or from the spectator. The drawings represent a machine geared to be turned by hand by means of a crank, (I), and one intended to be placed upon a bench of the proper elevation for that purpose. The cylinder may be covered with tin punched as before mentioned or stuck over with brads or points or have its surface otherwise roughened so as to produce a proper rasping effect on the peaches. I believe the method first mentioned to be preferable.

The box, (C C), upon which the axis of the cylinder rests and within which it revolves should be wide and long enough to leave a space of about three quarters of an inch on each side of the cylinder and three inches space at the left hand end. The gudgeon of the cylinder at this end bears upon the partition between the cylinder-box and the knife-box (D D), and extends half an inch beyond the bearing into the knife-box; and the knife, (G G), is screwed or pinned upon its extremity. The knife is about ten inches in length from the gudgeon, being sufficiently long to strike the stone of the peach and knock it through the opening in the bottom of the knife-box. It should be strongly made and not sharp, and should be balanced by a short shank on the opposite side of the gudgeon about one third of the length of the blade, to prevent the machine from trembling when under motion. (A blade on each side would make too many strokes.)

The hopper, (B B), covering the top of the cylinder is movable and is fastened to the cylinder-box by holes and pins. The sides of the hopper are somewhat flaring and about four inches deep. The upper side, (J J), is a little on this side of the axis of the cylinder and sits as close as possible to the cylinder without interfering; both which conditions are required to prevent the peaches from clinging at that juncture and being rasped to pieces. The back part extends down to the box (C C), so as to completely inclose the cylinder. The space from the top of the cylinder to the lid of the hopper will thus be about three and a half inches. Between the front side of the hopper and the cylinder there is the same space as between the cylinder and its box ($\frac{3}{4}$ of an inch). The sides and lid of the hopper are covered on the inside in the same manner as the cylinder in order that the peaches may be prevented from acquiring too rapid a rotary motion and thus passing off imperfectly peeled; as the roughened surface of the hopper retards their motion when they are thrown against it.

The box inclosing the knife, (D D), is about two inches wide leaving a space of one inch on each side of the knife, and sufficiently deep and broad to permit a free revolution of the knife. It is so constructed as to be attached to the cylinder-box by slides and grooves on the sides of the latter and may be detached by lifting the same vertically. For convenience of inspection, the top is movable. In the bottom is an opening under the knife about one inch in width and five or six inches long. This opening is made narrower than the box by means of a little flange or cleat, (K), fastened to the inside of the end of the box. And the opening may be enlarged or narrowed so as to vary the size of the pieces into which the peaches are to be cut, by opening or closing the outer side of the box, the lower half of which opens on hinges for this object. The part of the side that opens thus may be kept in place by screws pins or other similar means.

The peaches pass from the hopper into the knife-box by falling through the opening, H, upon the inclined plane (F, Fig. 2) over which they slide until they rest under the knife and directly over the opening in the bottom of the knife-box.

The same principle involved in this machine might be applied by causing a disk with a rasping surface to revolve under the peaches.

What I claim as my invention and desire to secure by Letters Patent is—

The application of a revolving rasping surface to the purpose of peeling peaches or other like fruits; and also the method of cutting peaches by a knife revolving in a box having an opening in the bottom in such a manner that the stone of the peach is struck out and the pulp thereof cut into pieces proper for drying in the manner above described. And I claim and desire that such Letters Patent should secure to me the aforesaid methods of peeling peaches and of cutting the same as well separately as when combined together in the manner hereinbefore particularly described.

JOSHUA O. WARD.

Witnesses:
GEORGE B. CRAMER,
HENRY B. DUNCAN.